United States Patent

[11] 3,626,882

[72] Inventors: Gilbert E. Russo;
Kenneth J. Meyers, both of Ellicott City;
Carl O. Buhlman, Baltimore, all of Md.
[21] Appl. No. 457,543
[22] Filed May 18, 1965
[45] Patented Dec. 14, 1971
[73] Assignee The United States of America as represented by the Secretary of the Navy

[54] MONITORING APPARATUS
8 Claims, 1 Drawing Fig.

[52] U.S. Cl. ................................................ 114/21 R
[51] Int. Cl. ................................................ F41g 7/02, F41g 7/06, F42b 19/36
[50] Field of Search ............................................ 114/20–25

[56] References Cited
UNITED STATES PATENTS
2,992,366 7/1961 Veltfort, Jr. ................ 317/137
3,148,651 9/1964 Ray ............................. 114/21 R Primary Examiner—Benjamin A. Borchelt
Assistant Examiner—Thomas H. Webb
Attorneys—G. J. Rubens, P. H. Firsht and V. C. Muller ABSTRACT: Apparatus for monitoring the operation of a wire-guided torpedo of the type having a number of control relays in the torpedo responsive to DC voltages from the control station. Each relay when actuated connects an AC source into the line, with a characteristic amplitude for each relay, providing an answer-back signal indicating proper operation of the relay. A voltage discriminating silicon controlled rectifier circuit in the control station responds to the answer-back signal lighting an indicator lamp to indicate which relay is actuated.

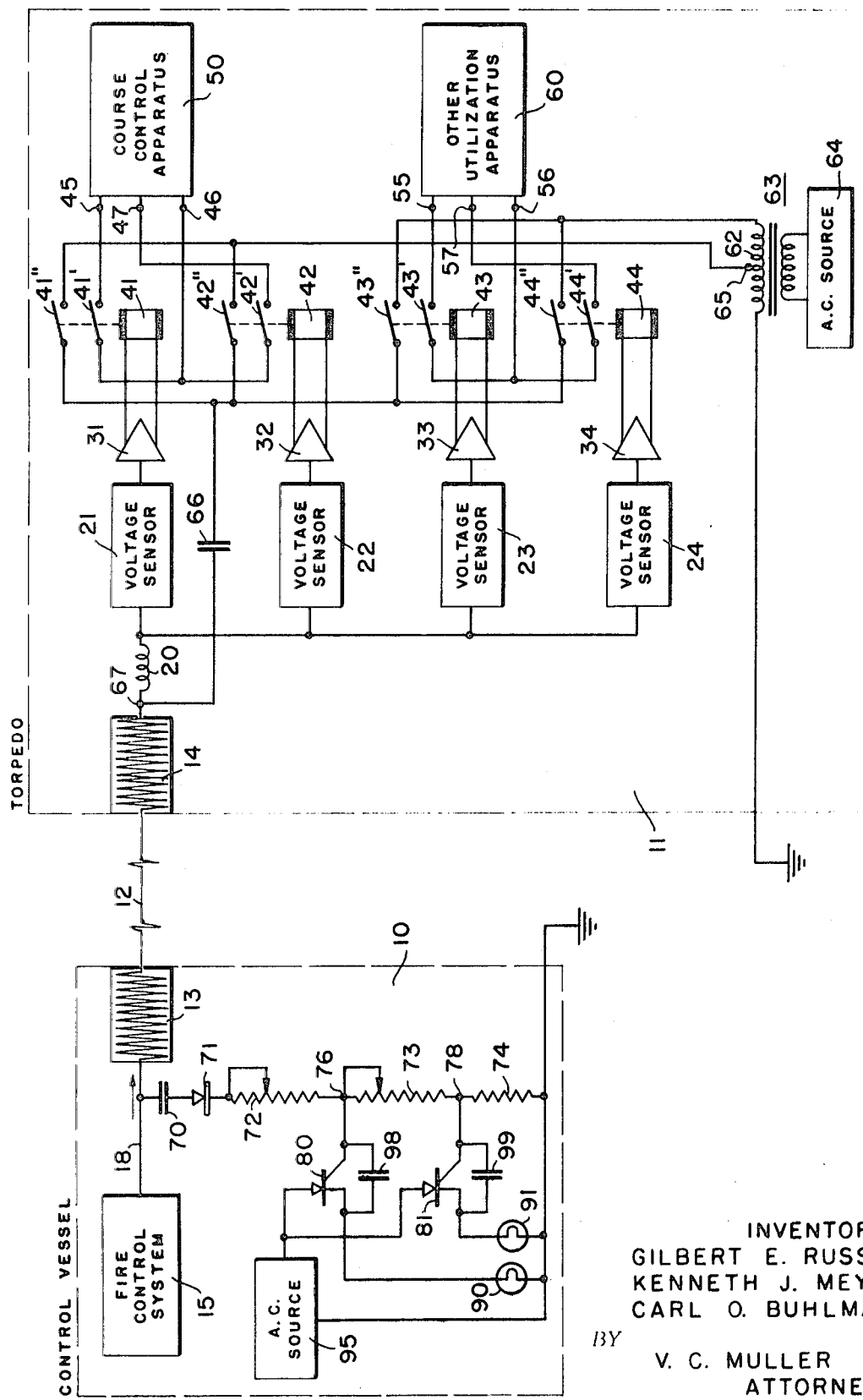
INVENTORS.
GILBERT E. RUSSO
KENNETH J. MEYERS
CARL O. BUHLMAN
BY
V. C. MULLER
ATTORNEY.

MONITORING APPARATUS

This invention relates to wire-guided torpedo systems, and particularly to apparatus for monitoring the operativeness of various elements of a wire-guided torpedo system.

The invention specifically concerns monitoring apparatus in novel combination with a wire-guided torpedo system, wherein the monitoring apparatus is adapted to check operativeness of certain elements of the system even under post launch conditions.

After a wire-guided torpedo is launched from a control vessel (which may be either a surface ship or a submarine, distinctive command signals which are generated at the fire control station (aboard the vessel) under control of an operator are transmitted via a guidance wire extending to the torpedo, the guidance wire automatically paying out from a dispenser carried by the control vessel. The torpedo includes a guidance receptor which is selectively responsive to the command signals, for example to control course and depth of the torpedo. Prior to the present invention there has been no means for ascertaining, after the torpedo has been launched, the condition of the guidance wire or of the guidance receptor or operativeness of the system. There are many types of failure which may be experienced by the guidance wire, such as full short, full open, and all resistance values between; these failures could result in improper commands (or no commands) being received by the torpedo, causing it to become misguided, or unguided. When the wire is in normal condition but the guidance receptor is malfunctioning or inoperative, the same situation will exist. The operator at the fire control station has no knowledge of the situation and may compound the error by continuing transmission of the error by additional commands.

It is an object of the invention to provide apparatus in combination with a wire-guided torpedo system, wherein the monitoring apparatus functions to check upon responsiveness of the guidance receptor in the torpedo.

It is another object of the invention to provide monitoring apparatus in combination with a wire-guided torpedo system, wherein the monitoring apparatus functions to check upon the condition of the guidance-wire link between the torpedo and the control vessel.

It is a further object of the invention to provide monitoring apparatus in combination with a wire-guided torpedo system, wherein the monitoring apparatus functions to check upon the condition of the guidance-wire link, and upon responsiveness of the guidance receptor in the torpedo, without interfering with normal control of the torpedo under actual operating conditions.

Other objects, advantages and novel features of the invention will become apparent from the following detailed description when considered in conjunction with the accompanying drawing wherein the single FIGURE illustrates an exemplary embodiment of the invention partly in schematic block diagram form as to the wire-guided torpedo system, and in schematic circuit form as to the monitoring apparatus shown in combination with the wire-guided torpedo system.

Referring now to the drawing, the wire-guided torpedo system comprises basically a launching and control vessel 10, a torpedo 11, and an insulated single-conductor guidance-wire 12 which, with sea water (not shown) forming the ground or return path, serves as a command signal communication link between the control vessel and the torpedo. The guidance wire is automatically paid out from dispensers 13 and 14, carried by control vessel 10 and torpedo 11, respectively, which contain wire coils and which may be of any suitable structure, for example as described in U.S. Pat. No. 3,148,651, entitled "Torpedo Control Apparatus," issued Sept. 15, 1964 to J. H. Ray. The torpedo command signals which are generated by any suitable apparatus (not shown) forming part of fire control system 15, and which in this instance are applied singly with suitable time separation (rather than simultaneously) to the fire control station end of the communication link via lead 18, here take the form of DC pulses which are of either polarity and of various preselected magnitudes in order to provide distinct signals for selective control of certain torpedo functions. As an example, the illustrated embodiment is to be understood as employing four distinct types of DC pulses, positive and negative 45-volt pulses for ordering say a 2° change of course to port or starboard, respectively, and positive and negative 160-volt pulses say for control of depth, or for control of the range setting at which a high-yield warhead carried by the torpedo is to be detonated, or for any other desired control function. These command pulses are communicated via guidance-wire 12, and passed by inductor 20 to a set of voltage sensors 21, 22, 23 and 24 which are selectively responsive to the command pulses. The voltage sensors may take the form of any conventional type of amplitude and polarity sensing circuit, voltage sensors 21, 22, 23 and 24 being selectively responsive to the positive 45-volt negative 45-volt positive 160-volt and negative 160-volt command pulses, respectively, to yield output signals which control amplifiers 31, 32, 33 and 34 respectively. The said amplifiers correspondingly energize relays 41, 42, 43 and 44, respectively, for suitably short periods so that there will be no interference or conflict between ordered functions. Each relay is provided with a pair of relay-controlled switches, the lower switch of each pair being employed for torpedo function control in response to relay energization, and the upper switch of each pair being employed for completing a feedback signal circuit in response to relay energization. Thus, energization of relay 41 (in response to reception of a positive 45-volt command pulse) closes lower switch 41' which, by connecting terminal 45 to terminal 46, triggers course control apparatus 50 to produce say a 2° change in course to port; energization of relay 42 (in response to reception of a negative 45-volt command pulse) closes lower switch 42' which, by connecting terminal 47 to terminal 46, triggers course control apparatus 50 to produce say a 2° change in course to starboard. Similarly, energization of relay 43 (in response to reception of a positive 160-volt command pulse) closes lower switch 43' which, by connecting terminal 55 to terminal 56, triggers utilization apparatus 60 to produce a predetermined incremental change in the torpedo function controlled by utilization apparatus 60 in one of opposite senses of change of the function. For example, where the torpedo function controlled by apparatus 60 is the depth setting which the torpedo runs, the incremental change may be to run at a depth 25 feet lower than its previous running depth. Energizing of relay 44 (in response to reception of a negative 160-volt command pulse) closes lower switch 44' which, by connecting terminal 57 to terminal 56, triggers utilization apparatus 60 to produce said predetermined incremental change in the torpedo function controlled by the utilization apparatus, but in the other of opposite senses of change of the function. Again using the example of control of depth setting, the incremental change may be to run at a depth 25 feet higher than its previous running depth.

Continuing with reference to the single FIGURE in the drawing, when any relay is energized in response to reception of a command signal by the guidance receptor comprising the bank of voltage sensors 21 to 24, causing the lower switch of the pair of relay-controlled switches of that relay to close and to operate the associated utilization apparatus, the upper switch of that pair also closes and completes a feedback signal circuit which causes actuation of an indicator in monitoring equipment located in proximity to the fire and control system 15 carried by control vessel 10. In the illustrated embodiment, the feedback signals are driven from center-tapped secondary winding 62 of a transformer 63 energized by an AC source 64. One end of the secondary winding 62 is connected to the sea water ground return, as indicated, and the full-voltage feedback signal developed by secondary winding 62 is in this instance applied to the right-hand contacts of the upper switches of relays 43 and 44; the lower-voltage feedback signal developed at secondary winding center-tap 65 is applied to the right-hand contacts of the upper switches of relays 41 and 42. The switch arms of the upper switches of the four relays 41 to 44 are all connected through a capacitor 66 to the junction point 67 at which inductor 20 connects to the guidance-wire. Capacitor 66 passes the AC feedback signals through the guidance-wire link 12 to the monitoring apparatus in control vessel 10, and inductor 20 prevents the feedback signals from affecting voltage sensors 21 to 24. In control vessel 10, the feedback signal circuit is completed by the monitoring apparatus input circuit formed by capacitor 70, diode 71, variable resistors 72 and 73 and fixed resistor 74, connected in that order between lead 18, at the command signal transmitter end of guidance-wire 12, and the sea water ground return. Capacitor 70 serves to pass the returning AC feedback signals to the monitor input circuit and prevents the outgoing command signal pulses from being shunted and undesirably attenuated by the monitor input circuit. Diode 71 functions to effect rectification of the incoming AC feedback signal and applies the resultant half-wave-rectified feedback signal to the resistor network which by potentiometer action provides suitable SCR (silicon-controlled rectifier) triggering voltages at junction point 76 between resistors 72 and 73 and at junction point 78 between resistors 73 and 74. In some instances it may be desirable to shunt the resistor network with a smoothing capacitor (not shown). The rectified feedback signal voltage appearing at junction points 76 and 78 relative to the sea water ground return are applied to the gate (control) electrode of SCR 80 and SCR 81, respectively. The base circuits of SCR 80 and SCR 81 are completed to reference ground through indicator lamps 90 and 91, respectively. The emitter-to-base circuits of SCR 80 and SCR 81 are energized by AC source 95 and, as necessary for proper SCR action, the gate and base electrodes of SCR 80 and SCR 81 are shunted by capacitors 98 and 99, respectively.

By way of example, the guidance-wire communication link in a practical embodiment has been found to attenuate a 400 c.p.s. feedback signal by approximately 20 db. Voltages and component specifications which have been found satisfactory, under such condition, for the described monitoring circuit embodying the invention, are as follows:

| | |
|---|---|
| Transformer 63 full secondary voltage | 115 volts at 400 c.p.s. (nominal) |
| AC source 95 voltage | 115 volts at 400 c.p.s. (nominal) |
| Inductor 20 | 0.05 henry |
| Capacitors 66, 70, 98, 99 | 0.1 microfarad |
| Resistors 72, 73, 74 | 1000 ohms |
| Diode 71 | 1N459 |
| Silicon controlled rectifiers 98, 99 | 2N1597 |
| Lamps 90, 91 | 28-volt, 100 ma. |

Simulating, and impressing upon were the monitoring apparatus input circuit, feedback signals corresponding to the attenuated lower-voltage and full-voltage feedback signals which would be received when relay 41 or 42, or relay 43 or 44, respectively, are energized, resistors 72 and 73 are adjusted so that, in the first (low-voltage feedback signal) case, only indicator lamp 90 lights, and so that, in the second (high-voltage feedback signal) case, both indicator lamps 90 and 91 light. The lamps remain in ON condition only during the ON time of the various relays since an AC source is employed for energization of SCR 80 and SCR 81.

By way of example of the manner in which the monitoring circuit operates to indicate malfunctioning of the wire-guided torpedo system, when there is an abnormally high resistance condition in the communication link which causes the command pulse to be abnormally attenuated, and a high-voltage command pulse is transmitted, the command pulse is received at the guidance receptor as a low-voltage command pulse, resulting in closure of low-voltage relay feedback contacts instead of high-voltage relay feedback contacts; correspondingly, the feedback signal returned to the monitoring apparatus is a low-voltage feedback signal which gates only the SCR 80 circuit, lighting only lamp 90 and thus indicating that an improper command signal has been received at the guidance receptor. If the guidance-wire communication link were in good condition, the resultant feedback signal and lamp indication would correspond to the command signal; if the guidance-wire link were open or shorted, no feedback signal would be received. The monitoring system can likewise serve to indicate guidance receptor malfunctions.

While the invention has been described in terms of an exemplary embodiment wherein the monitoring apparatus employs a voltage-dividing input network and associated silicon controlled rectifiers and indicating lamps, obviously many modifications and variations are possible in the light of the above teachings. For example, the described input network and associated indicating circuitry may be replaced by a calibrated oscilloscope having a comparatively low series input capacitance and set for 400 c.p.s. sweep, which would enable precise measurement of the feedback signal. It is therefore to be understood that within the scope of the appended claims the invention may be practiced otherwise than as specifically described.

What is claimed is:
1. A wire-guided torpedo system and monitoring apparatus, comprising in combination:
   a. a torpedo having a command signal guidance receptor;
   b. a control vessel having a wire-guided torpedo fire control system;
   c. a guidance wire and sea water return communication link extending from said fire control system to the guidance receptor of said torpedo;
   d. said fire control system being adapted to generate and transmit to said guidance receptor, via said guidance wire, command signals in the form of DC pulses having distinguishing polarity and amplitude characteristics for selective control of predetermined torpedo functions;
   e. said guidance receptor including voltage sensors and relays for selective energization in response to command signals received by said voltage sensors via said guidance wire, for control of said torpedo functions;
   f. said torpedo further having a multivoltage AC feedback signal source;
   g. each of said relays having a relay-controlled switch connected with said source to apply an AC feedback signal, of relay-identifying amplitude, to said guidance wire in response to relay energization; and
   h. indicating means, carried by said control vessel in proximity to said fire control system, connected to said guidance wire communication link and operating to indicate the amplitude of said AC feedback signal as returned via said guidance-wire communication link.

2. A wire-guided torpedo system and monitoring apparatus combination as defined in claim 1, wherein
   i. said command signals are communicated from the torpedo end of said guidance wire to said voltage sensors through an inductor;
   j. and wherein said feedback signals are applied to the junction of said guidance wire and said inductor through a capacitor;
   k. whereby said feedback signals are communicated through said capacitor to said guidance wire for transmission to said indicating means but blocked by said inductor from affecting said voltage sensors.

3. A wire-guided torpedo system and monitoring apparatus combination as defined in claim 1, wherein
   i. said feedback signals are communicated from the fire control system end of said guidance wire to said indicating means through a capacitor;
   j. whereby to pass the returning feedback signals to said indicating means while substantially preventing the outgoing command signals from being attenuated by said indicating means.

4. A wire-guided torpedo system and monitoring apparatus combination as defined in claim 1, wherein
   i. said command signals are applied from the torpedo end of said guidance wire to said voltage sensors through an inductor;

j. wherein said feedback signals are applied to the junction of said guidance wire and said inductor through a first capacitor;
k. and wherein said feedback signals are applied from the fire control system end of said guidance wire to said indicating means through a second capacitor;
l. whereby said feedback signals are communicated through said first capacitor to said guidance wire for transmission to said indicating means but blocked by said inductor from affecting said voltage sensors;
m. and whereby said second capacitor couples said indicating means to said guidance wire for receiving feedback signals therefrom, but substantially prevents attenuation of outgoing command signals by said indicating means.

5. A wire-guided torpedo system and monitoring apparatus combination as defined in claim 1, wherein
   i. said indicating means comprises an input circuit including means for attenuating and rectifying returned feedback signals to yield silicon controlled rectifier gating signals;
   j. and at least two silicon controlled rectifiers having base-to-ground circuits including indicator lamps, emitter-to-ground circuits energized by an AC source, and gate electrode circuits responsive to said gating signals to light said indicator lamps provided the returned feedback signals are of normal amplitude as a result of proper functioning of said system.

6. A wire-guided torpedo system and monitoring apparatus combination as defined in claim 5, wherein
   k. said command signals are communicated from the torpedo end of said guidance wire to said voltage sensors through an inductor;
   l. and wherein said feedback signals are applied to the junction of said guidance wire and said inductor through a capacitor;
   m. whereby said feedback signals are communicated through said capacitor to said guidance wire for transmission to said indicating means but blocked by said inductor from affecting said voltage sensors.

7. A wire-guided torpedo system and monitoring apparatus combination as defined in claim 5, wherein
   k. said feedback signals are communicated from the fire control system end of said guidance wire to said indicating means through a capacitor;
   l. whereby to pass the returning feedback signals to said indicating means while substantially preventing the outgoing command signals from being attenuated by said indicating means.

8. A wire-guided torpedo system and monitoring apparatus combination as defined in claim 5, wherein
   k. said command signals are applied from the torpedo end of said guidance wire to said voltage sensors through an inductor;
   l. wherein said feedback signals are applied to the junction of said guidance wire and said inductor through a first capacitor;
   m. and wherein said feedback signals are applied from the fire control system end of said guidance wire to said indicating means through a second capacitor;
   n. whereby said feedback signals are communicated through said first capacitor to said guidance wire for transmission to said indicating means but blocked by said inductor from affecting said voltage sensors;
   o. and whereby said second capacitor couples said indicating means to said guidance wire for receiving feedback signals therefrom, but substantially prevents attenuation of outgoing command signals by said indicating means.

* * * * *